(12) United States Patent
Hewson

(10) Patent No.: US 11,736,757 B2
(45) Date of Patent: Aug. 22, 2023

(54) METHOD AND SYSTEM FOR PROVIDING CONTENT TO A MEDIA PLAYING DEVICE

(71) Applicant: Hoppr Ltd, Subiaco (AU)

(72) Inventor: Jason Hewson, Subiaco (AU)

(73) Assignee: Hoppr Ltd, Subiaco (AU)

( * ) Notice: Subject to any disclaimer, the term of this patent is extended or adjusted under 35 U.S.C. 154(b) by 0 days.

(21) Appl. No.: 17/012,844

(22) Filed: Sep. 4, 2020

(65) Prior Publication Data

US 2021/0084359 A1 Mar. 18, 2021

Related U.S. Application Data

(63) Continuation of application No. PCT/AU2020/050807, filed on Aug. 5, 2020.

(30) Foreign Application Priority Data

Aug. 5, 2019 (AU) .................................. 2019902800

(51) Int. Cl.
*H04N 21/431* (2011.01)
*H04N 5/272* (2006.01)
*H04N 21/442* (2011.01)

(52) U.S. Cl.
CPC ......... *H04N 21/4312* (2013.01); *H04N 5/272* (2013.01); *H04N 21/44222* (2013.01)

(58) Field of Classification Search
CPC ........... G06Q 30/0241; G06Q 30/0251; H04N 21/4312; H04N 21/4316; H04N 21/43615; H04N 21/44204; H04N 21/44213; H04N 21/44222; H04N 21/4722; H04N 21/6582; H04N 21/812; H04N 5/272; H04N 21/23424; H04N 21/2668; H04N 21/2747;
(Continued)

(56) References Cited

U.S. PATENT DOCUMENTS

| 5,644,772 A | 7/1997 | Mann |
| 8,695,038 B2 | 4/2014 | Walker et al. |
| 9,510,051 B1 | 11/2016 | Bostick et al. |

(Continued)

FOREIGN PATENT DOCUMENTS

| EP | 0212393 A2 | 3/1987 |
| EP | 3462748 | 4/2019 |

(Continued)

*Primary Examiner* — Farzana Hossain
(74) *Attorney, Agent, or Firm* — Knobbe, Martens, Olson & Bear, LLP

(57) ABSTRACT

A content overlay system for a digital device is described. The content overlay system includes a processing module configured to monitor events of the digital device to generate data indicative of the activation of and/or use of one or more applications of the digital device. The processing module is configured to process the generated data to determine timing data indicative of when to overlay content on an active window and/or to determine what content to overlay. An overlay generation module is configured for placing an overlaid window in front of the active streaming window or application and for displaying content in the overlaid window. The overlay generation module being configured to generate the overlaid window and display content from an overlaid content server according to the determined timing data and/or determined content.

37 Claims, 3 Drawing Sheets

(58) Field of Classification Search
CPC ............ H04N 21/8586; H04N 21/2662; G06F 16/9558
See application file for complete search history.

(56) References Cited

U.S. PATENT DOCUMENTS

| | | | |
|---|---|---|---|
| 9,799,054 | B2 | 10/2017 | Forsblom |
| 9,971,713 | B2 | 5/2018 | Asaad et al. |
| 10,970,749 | B2* | 4/2021 | Cassidy ............. G06Q 30/0269 |
| 2007/0180160 | A1* | 8/2007 | Schweig ............... G06F 3/0227 |
| | | | 710/15 |
| 2008/0068500 | A1 | 3/2008 | Krause |
| 2009/0158205 | A1* | 6/2009 | Hampton ................ G06F 9/453 |
| | | | 715/790 |
| 2010/0014825 | A1 | 1/2010 | Curtis et al. |
| 2010/0153990 | A1 | 6/2010 | Ress et al. |
| 2011/0023077 | A1 | 1/2011 | Simon |
| 2011/0041153 | A1 | 2/2011 | Simon et al. |
| 2011/0167456 | A1 | 7/2011 | Kokenos et al. |
| 2012/0116867 | A1 | 5/2012 | Reis et al. |
| 2014/0109118 | A1 | 4/2014 | Kokenos et al. |
| 2014/0359656 | A1 | 12/2014 | Banica et al. |
| 2015/0095455 | A1* | 4/2015 | Spitz .................... H04N 21/812 |
| | | | 709/217 |
| 2015/0181268 | A1 | 6/2015 | Navin et al. |
| 2015/0220814 | A1* | 8/2015 | Verkasalo .......... G06Q 20/3255 |
| | | | 382/103 |
| 2015/0281776 | A1 | 10/2015 | Desai et al. |
| 2016/0100121 | A1 | 4/2016 | Shintani et al. |
| 2016/0117722 | A1 | 4/2016 | Garcia |
| 2016/0198239 | A1* | 7/2016 | Shenkler ............ G06Q 30/0269 |
| | | | 725/32 |
| 2016/0366464 | A1* | 12/2016 | Rouady .............. H04N 21/4758 |
| 2017/0041655 | A1 | 2/2017 | Harrison et al. |
| 2017/0228762 | A1 | 8/2017 | Riviello et al. |
| 2018/0032997 | A1* | 2/2018 | Gordon ............. G06Q 30/0269 |
| 2019/0037254 | A1 | 1/2019 | Fennelly |
| 2019/0098362 | A1 | 3/2019 | Gutman |
| 2019/0166403 | A1* | 5/2019 | Yelton ................ H04N 21/8405 |
| 2021/0127150 | A1* | 4/2021 | Alagarsamy ....... H04N 21/2402 |

FOREIGN PATENT DOCUMENTS

| | | |
|---|---|---|
| WO | WO 2014/032708 A1 | 3/2014 |
| WO | WO 2014/047335 A2 | 3/2014 |
| WO | WO 2015/031802 A1 | 3/2015 |
| WO | WO 2015/131043 A1 | 9/2015 |
| WO | WO 2016/074999 A1 | 5/2016 |
| WO | WO 2016/111872 A1 | 7/2016 |
| WO | WO 2016/172715 A1 | 10/2016 |
| WO | WO 2017/048718 A1 | 3/2017 |
| WO | WO 2017/112520 A1 | 6/2017 |
| WO | WO 2018/071781 A2 | 4/2018 |
| WO | WO 2018/183430 A1 | 10/2018 |
| WO | WO 2018/183441 A1 | 10/2018 |
| WO | WO 2019/043655 A1 | 3/2019 |
| WO | WO 2019/046533 A1 | 3/2019 |

* cited by examiner

METHOD AND SYSTEM FOR PROVIDING CONTENT TO A MEDIA PLAYING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The disclosed technology relates to methods and systems for controlling a digital device, including providing digital content (such as video, images, sound etc) as a content overlay container over any application running on a digital device.

Description of the Related Art

So called "set top boxes" (STB) are media playing devices that are commonly connected to television (TV) or other type of display monitor. Such a STB is typically a dedicated computing device commonly having an operating system specifically designed for this purpose and a streaming content player in the form of a computer software application for receiving media streamed from the Internet or from a local source (eg. a DVD or Blu-ray disc, or local network drive). Commonly STBs use a version of the Android™ operating system.

So called "mobile devices" are mobile phones or tablets. Such a mobile device is typically a computing device commonly having an operating system which hosts applications including but not limited to SMS, Gallery and Home Screen.

A digital device is a device capable of playing media, such as a STB, or mobile device. It is desirable to provide additional content to a user of a media playing device, such as advertising. For example, it is desirable to advertise to the user of a streaming service that is about to watch a movie, in order to gain an additional revenue for the streaming service. For a mobile device, an example is to provide display advertising as an overlay over certain applications, such as, but not limited to a media streaming/playing application.

The disclosed technology has been developed to provide an overlay content container for multiple digital devices including but not limited to streaming players and mobile devices.

SUMMARY

According to an aspect of the disclosed technology there is provided a content overlay system for a digital device comprising: a processing module configured to monitor events of the digital device to generate data indicative of the activation of and/or use of one or more applications of the digital device, the processing module being configured to process the generated data to determine timing data indicative of when to overlay content on an active window and/or to determine what content to overlay; and an overlay generation module for placing an overlaid window in front of the active streaming window or application and for displaying content in the overlaid window; the overlay generation module being configured to generate the overlaid window and display content from an overlaid content server according to the determined timing data and/or determined content.

In an embodiment the applications comprise a streaming content player. In an embodiment, monitoring events comprises monitoring streaming content players of the digital device. In particular the activation and/or use of applications comprises activation of and/or use of streaming content players of the digital device. In an embodiment the digital device is a media playing device and/or another device connectable to the media playing device and/or a mobile device.

In an embodiment, the system further comprises a behaviour module for monitoring applications used on the digital device. In an embodiment, the monitoring comprises determining which applications are used and when they are used. In an embodiment, the behaviour module allocates at least one tag to each use of each application used. In an embodiment, the tags are an indication of user behaviour.

In an embodiment, a tag may be allocated for a time period. The length of the time period may depend on the type of tag. In an embodiment, the behaviour module is configured so that at the end of the time period the tag is removed.

In an embodiment, the behaviour module is configured so that tags are ranked according to time when the application that caused the tag to be allocated was last used. In an embodiment, the behaviour module is configured so that the tags are accumulated according to the applications used until they each are removed due to age.

In an embodiment, the behaviour module is configured so that tags used are IAB categories.

In an embodiment, the processing module sends the generated data to the overlaid content server and the overlaid content server provides content to be displayed to the overlay generation module. In another embodiment, the processing module requests the overlaid content server provide content to be displayed according to the generated data. In an embodiment, the overlaid content server provides content according to a content type. In an embodiment, the content type is determined according to the generated data.

In an embodiment, the or each application provides the activity it is performing to the processing module.

In an embodiment, the overlay generation module comprises an alert window created by an operating system or a software component bundled with an operating system.

In an embodiment, the overlaid window is configured as a web container.

In an embodiment, the overlaid window is configured according to the generated data. In an embodiment, the configuration of the overlaid window is made according to the generated data and/or a content type.

In an embodiment, the content is an advertisement.

In an embodiment, a user module of the digital device is configured to create an account stored by the overlaid content server, and to store an identification to the user allocated by the overlaid content server.

In an embodiment, the location of the digital device is determined and the location is used to determine the overlaid content.

In an embodiment, the system further comprises a control module configured to provide control signals to the active streaming content player. In an embodiment, the control signal is in the form of an injected key stroke or button press/tap. In an embodiment, the control module intercepts key strokes or button presses/taps received from a user. In an embodiment, the intercepted key strokes are stored for later injection into an input of the streaming content player.

In an embodiment, the control module is configured to parse in-application inputs and when configured to do so, initiates overlaid content, which upon completion then provides the input to the application.

In an embodiment, the processor module is configured such that key strokes or button presses/taps received by the media player device are intercepted and later injected as input to the streaming content player to facilitate presentation of the overlaid content. For example, the streaming may be paused so that the overlaid content is not interrupted. Once the overlaid content is finished (and in some cases the overlaid window closed) the streaming is resumed, and the intercepted key strokes are then provided to the streaming content player. Thus, the streaming content is not missed due to presentation of the overlaid content.

In an embodiment, the processing module is also configured to generate data based on the content to be or being streamed. In an embodiment, this data may be used to select the overlaid content.

In an embodiment, the system comprises a connection to a mobile device. In an embodiment, the overlaid content, or related content, is transmitted to the mobile device via the connection.

In an embodiment, the mobile device is configured to generate a user profile by monitoring applications used on the mobile device. In an embodiment, the user profile is sent to the behaviour module for inclusion in the indication of user behaviour. In an embodiment, the monitoring comprises determining which applications are used and when they are used. In an embodiment, the mobile device allocates at least one tag to each use of each application used. In an embodiment, the tags are used in the user profile.

According to an aspect disclosed there is provided an overlaid content server for serving overlaid content to a digital device, said server comprising: a receiver of data from one or more digital devices, the data indicative of the activation of and/or use of one or more applications, and behaviour of a respective user of the corresponding digital device; a processor for determining overlaid content to be transmitted to the respective digital device, wherein the determination comprises selecting and/or configuring content according to one or more of the activation of and/or use of one or more of the applications of the corresponding digital device, and behaviour of a respective user of the corresponding digital device; a transmitter of the respective overlaid content to the corresponding digital device.

In an embodiment, the behaviour comprises tags that are an indication of user behaviour and the tags are used to select overlaid content to be transmitted to the corresponding digital device.

In an embodiment, the receiver also receives information from the digital device to create an account. The server allocates an identification to the user and the transmitter transmits the identification to the digital device. In an embodiment the server comprises a database for storing the respective user behaviour in association with the identification of the corresponding user.

In an embodiment, the receiver also receives the location of the respective digital device and this is stored in the database in association with the identification of the corresponding user. In an embodiment, the processor is configured to use the information stored in the database to determine the overlaid content and/or the configuration of the respective overlaid content to be transmitted to the corresponding digital device.

In an embodiment, the receiver receives data indicative of the content to be or being streamed where the application is a media streaming player of the corresponding digital device, and the processor is configured to select and/or configure the respective overlaid content to be transmitted to the corresponding digital device.

According to an aspect disclosed there is provides a method of providing overlaid content on a digital device, comprising: monitoring one or more applications of the digital device to generate data indicative of the activation of and/or use of one or more of the applications; determining timing of when to overlay content on an active window of an active one of the applications, and/or what content to overlay, based on the generated data; and placing an overlaid window in front of the active streaming window; receiving overlaid content from an overlaid content server according to the determined timing and/or determined content; displaying the overlaid content in the overlaid window.

In an embodiment, the method further comprises monitoring applications used on the digital device and/or another device connectable to the digital device and determining which applications are used and when they are used. In an embodiment, the method further comprises allocating at least one tag to each use of each application used.

In an embodiment, the method further comprises expiring a tag that is older than a time period.

In an embodiment, the method further comprises ranking the tags according to a time when the application that caused the tag to be allocated was last used.

In an embodiment, the method further comprises sending the generated data to the overlaid content server and receiving overlaid content to be displayed from the overlaid content server.

In another embodiment, the method further comprises requesting overlaid content to be displayed from the overlaid content server according to the generated data.

In an embodiment, the method further comprises receiving from the application the activity it is performing and determining the timing of when to overlay content, and/or what content to overlay, based on the activity.

In an embodiment, the method further comprises configuring the overlaid window according to the generated data.

In an embodiment, the method further comprises providing control signals to the active streaming content player. In an embodiment, providing the control signal comprises injecting a key stroke or button press/tap into the input of the streaming content player. In an embodiment, the method further comprises intercepting key strokes or button presses/taps received from a user. In an embodiment, the method further comprises delaying injecting intercepted key strokes into the input of the streaming content player such that the overlaid content can be provided without interruption of the overlaid content and/or without missing the streamed content.

In an embodiment, the method further comprises parsing in-application inputs, which initiates overlaid content, and upon completion of the overlaid content, then provides the input to the application.

In an embodiment, the method further comprises generating data based on the content to be or being streamed. In an embodiment, the method further comprises selecting the overlaid content according to the generated data.

In an embodiment, the method further comprises transmitting the overlaid content or related content to a connected mobile device.

In an embodiment, the method further comprises generating a user profile by monitoring applications used on a mobile device. In an embodiment, the method further comprises sending the user profile from the mobile device to the digital device for inclusion in the data indicating user behaviour. In an embodiment, the method further comprises generating the user profile by determining which applications are used and when they are used. In an embodiment, the method further comprises generating the user profile by allocating at least one tag to each use of each application used.

Also according to another aspect of the disclosed technology there is a method of controlling a digital device comprising:

receiving a command to operate the device to perform a task; checking whether a condition is met; when the condition is met, deferring performing the task and performing an alternative task instead; when the alternative task is completed, resuming the task that was deferred.

In an embodiment, the alternative task is overlaying content in an overlaid window in front of a window of the deferring task. In an embodiment, the deferred task is to playing streamed video content. In an embodiment, deferring the task comprises pausing playing the video content. In an embodiment, further received commands to the deferred task are ignored until the deferred task is resumed. In an embodiment, pausing of the deferred task comprising injecting a pause command to an input of an application performing the deferred task. In an embodiment, resuming the task comprises injecting a play or other activation command to the input of the application performing the deferred task.

In an embodiment, the condition comprises the command being to start an action on an application and the application being one which meets one or more criteria of a profile.

Also according to the disclosed technology there is provided a digital device comprising a module configured to: receive a command to operate the device to perform a task; check whether a condition is met; when the condition is met, defer performing the task and perform an alternative task instead; when the alternative task is completed, resume the task that was deferred.

Also according to another aspect of the disclosed technology there is a method of profiling a user of a digital device comprising: monitoring applications user on the device; where each monitored application on the device is allocated a category tag; for each application used, adding a tag to the profile according to the category allocation to the respective application; removing a tag from the profile when the application is unused for a period of time.

In an embodiment, sub-categories of tag are allocated to the profile according to content of the used application. In an embodiment, the source of content, indexing information or other information is used to look up the sub-category tag.

Also according to the disclosed technology there is provided a digital device comprising a module configured to: monitor applications user on the device, where each monitored application on the device is allocated a category tag; for each application used, add a tag to the profile according to the category allocation to the respective application; remove a tag from the profile when the application is unused for a period of time.

Throughout the specification and claims, unless the context requires otherwise, the word "comprise" or variations such as "comprises" or "comprising", will be understood to imply the inclusion of a stated integer or group of integers but not the exclusion of any other integer or group of integers.

BRIEF DESCRIPTION OF THE DRAWINGS

In order to provide a better understanding of the disclosed technology, example embodiments will now be described with reference to the accompanying drawings, in which.

DETAILED DESCRIPTION

Figure 1:
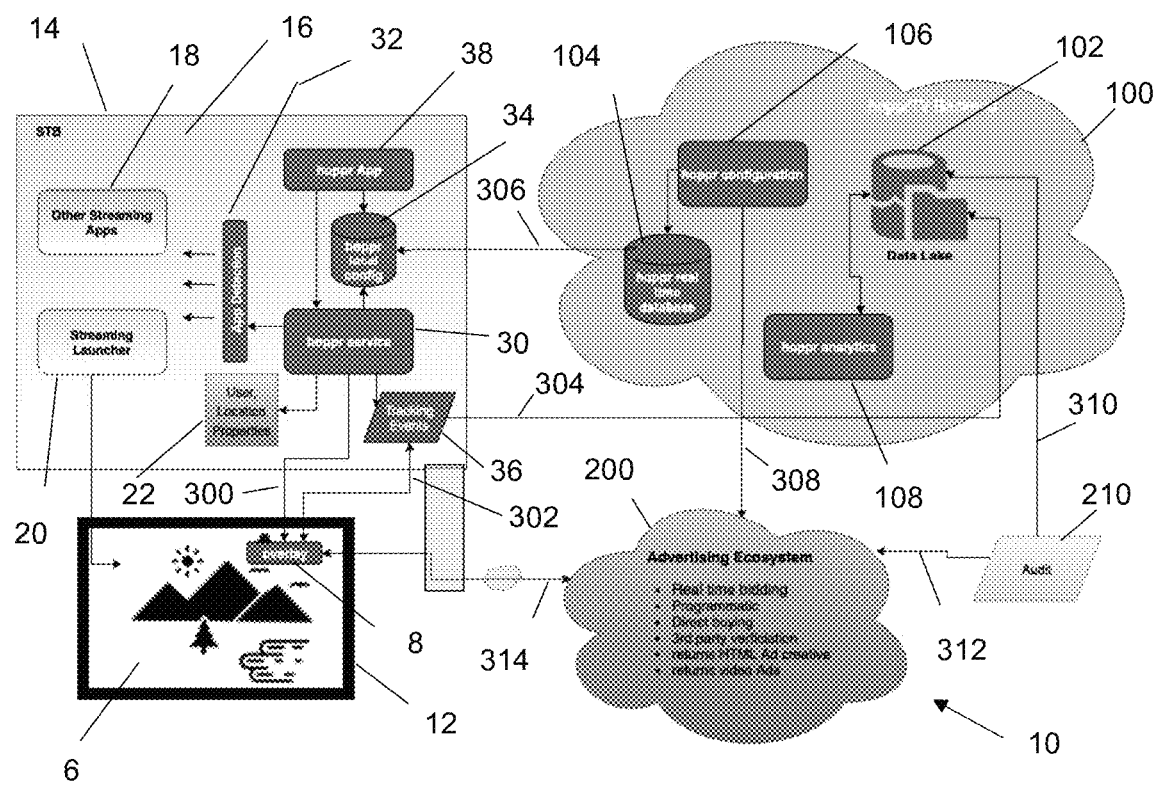
FIG. 1 is a schematic plan view of a content overlay system in a digital device according to an embodiment of the disclosed technology.

Referring to FIG. 1, there is a media playing system 10 comprising a display 12, and a digital device, such as a media playing device 14, such as for example a set top box (STB) having a computer processor running an operating system 16, such as a version of the Android™ operating system suitable for controlling a STB. The STB comprises a streaming launcher 20 and other streaming applications (Apps) 18 which obtain streamed content from a streamed media provider (eg. Netflix™, Stan™, Foxtel™ etc.) from the Internet or from a local source (eg. a DVD™ or Blu-Ray™ disc, or local network drive). There is also an Advertising Ecosystem 200, comprising an overlaid content server, which provides HTML Ads and video Ads, and infrastructure to provide real time bidding for advertising, programmatic advertising, direct buying, and third party verification. The digital device could take other forms, such as a mobile device (phone or tablet), or personal computer.

The system 10 comprises a service 30 installed into the media playing device 14 and a remote, Internet connected backend system 100 running on a server (typically a virtual server or cluster of servers). The service 30 is a processing module implemented by computer software comprising instructions for controlling the processor to control the operation of overlaid content on the media playing device 14. The processing module comprises a monitoring module 32 which detects the launch and use of Apps in the media playing device 14 and generates data reflective of the use of the Apps. The processing module also is configured to process the data generated from the Apps use to determine timing of when to overlay content on an active window of an active one of the streaming content players and/or to determine what content to overlay.

The processing module also comprises an overlay generation module for placing an overlaid window 8 in front of the active streaming window 6 and for displaying content in the overlaid window 8 (overlay). The overlay generation module is configured to generate 300 the overlaid window and display content 314 from the overlaid content server of the ecosystem 200 according to the determined timing and/or determined content. The overlaid window 8 may be full screen in size or smaller.

The service 30 also comprises a local configuration database 34 for storing the received configuration data from the backend system 100.

The service 30 also comprises a behaviour module 36 for monitoring applications used on the media playing device and/or another device connectable to the media playing device. In an embodiment, the monitoring comprises determining which applications are used and when they are used. In an embodiment, the behaviour module allocates at least one tag to each use of each application used. In an embodiment, the tags are an indication of user behaviour. The behaviour module 36 also tracks events that occur arising from interaction of the user with the overlay 8.

All actions that the service 30 is configured (according to the configuration in database 34) to watch, will cause the behaviour module 36 to create events that are sent through to a data lake 102 of the backend system 100.

The service 30 also comprises an interface 38 to a remote device with a user interface, such as a remote control or a remote control Application on a mobile computing device (such as a smart phone, tablet or similar). The interface 38 may be a leanback UI.

The service 30 is a software application preferably running as a background application. The software application comprises instructions for controlling a processor of the media playing device 14 to operate in a manner to perform the functionality required (in conjunction with the operating system 16). The computer software may be stored in non-volatile memory (such as a hard disk drive or flash drive) of the device 14 and accessed by the processor for execution. The operating system 16 may be customised in a STB or similar device to provide the service 30 with sufficient privileges, such as super-user privileges, sufficient to perform as described herein.

The service 30 automatically launches upon startup or reboot of the device 14. Upon first run, the service 30 creates a user account, and automatically obtains an identifier, such as an Android Advertising ID to allow integration into advertising ecosystem 200 to provide programmatic advertising. The service 30 also determines the location of the set top box from stored location properties 22 for locational based advertising.

After startup, the service 30 then goes into application detection mode where the monitoring module 314 commences its monitoring of activity for configured applications 18/20.

All content streaming applications (and other applications) 18/20 on the STB broadcast the various activities they perform. For example, a streaming application will report that it is
    viewing Live TV,
    in the Video on Demand section,
    viewing a Programme Synopsis
    or Playing content.
    Etc.

Even applications that are not advertised upon can be monitored and reported on through an analytics capability provided by an analytics module 108.

When the processing module of the service 30 detects an application activity that is configured to have an overlay and meets all other conditions (timing. scheduling etc) then it will launch an overlay component.

The data lake 102 is configured to receive data 304 from the behaviour module 36 (as well as other behaviour modules of other media playing devices). The data lake 102 provides detailed granular data views on all activities that have occurred in the ecosystem 200 and the individual STB level and summary level, such as:
    Streaming Application entered
    Streaming Application activity entered
    Advert shown
    Advert completed The data lake 102 may also store analytics generated by the analytics module 108. The analytics module 108 is configured to analyse the data from the behaviour module(s) 36 and provides business intelligence tools to analyse the data lake 102 for:
    User behaviour and activity
    Application usage
    Ad viewability and auditing.

The backend system 100 comprises a configuration module 106 which is used to control the operation of the system 10 by storing control data in a real time database 104, which then replicates 306 relevant data from the backend system 100 to the (each) connected local configuration database 34 of the (respective) media playing device 14. The configuration module 106 is also able to provide input to the advertising ecosystem 200 as settings for advertising to be including in the overlaid content 8.

The system 10 also comprises an audit module 210 which provides audit functionality 312 based on the data obtained from 310 the data lake 102.

The backend system 100 is controlled by computer software comprising instructions for controlling a processor thereof the operate in a manner to perform the functionality required. The computer software may be stored in non-volatile memory (such as a cloud storage device) of the system 100 and accessed by the processor for execution.

The configuration module 106 allows the behaviour of overlays on player devices 14 to the finely controlled. Control can extend to:

STB Application Activities Definitions a. Define what Application activities for the service 30 to detect
b. Multiple activities per application Overlay Group Definitions a. Sizing
b. Scaling
c. Timing behaviour
d. Animation Overlay Definitions a. HTML snippets
b. JavaScript advertising integration code
c. API 3rd party integration
d. Images with local caching
e. Keyword replacement to integrate device level data
Scheduling The configuration module 106 allows all these states of all content streaming Apps to be targeting with different types of advertising—ie. banner ads, interstitial full screen takeovers etc.
Overlay The service 30 will launch an overlay 8 when it detects the appropriate application activity according to the configuration stored in the configuration database 34.

In an embodiment the overlay 8 utilises an Android™ feature called an alert window which, with the correct permissions, is able to display above other applications. In a preferred form the overlay 8 is a web container that can be positioned anywhere on the screen according to the screen real estate available and can be scaled to any size. This overlay is separate from the streaming applications and sits over the top of those applications showing advertising or other notifications and can be configured (e.g. size and timing) for each application.

In an embodiment, when the configuration details are altered by the configuration module 106 for, say, the position of the overlay, then that will change will be propagated to the database 104 and then respective databases 34 in real time across all devices 14.

The overlay itself can be:
Image
    Direct image, such as a direct advertisement, is an image link that is scaled and shown in the overlay. It is also cached on the device for fast access.
HTML
    HTML snippet such as an ad creative.
URL
    URL link to an html page that will be shown in the overlay
JavaScript callout
    A JavaScript component such as an integration point into an advertising supply side bidding platform which returns an HTML ad creative
    API integration—an integration into an advertising ecosystem that returns a HTML ad creative The JavaScript callouts and API integration can contain extensive metadata about the user and device as well as tagging capabilities for advertising targeting. This is achieved by keyword replacement in the integration definition for key value pairs specified in the ad ecosystem javascript or API interface.

Advertising Integration

The advertising ecosystem 200 is configured preferably with java script and API integrations to access the real time bidding and marketplaces of programmatic buying and so provide a good return on investment spending on advertising. Detailed device and user-based data can be provided through these integration points to ensure correct advertising targeting. There are no restrictions on creative sizing and all IAB standard sizings plus any custom sizes can be served in the overlay 8.

It is possible to have a high certainty that adverts purchased are seen and consumed and that that consumption is accurately recorded. Adverts do not appear "below the fold", nor are they otherwise not visible.

Active Tagging

Publishers use tags to communicate the classification of content on their site. Tags are essentially keywords that generally define the nature of web content such as news, sport, etc. The Interactive Advertising Bureau (IAB) of Australia provides a list of Publisher Categories that is a list of content categories and subcategories for defining publisher content. When advertisers place advertising hooks into their content pages, those hooks pass through the specified tags to ensure that appropriate and relevant advertising creative is returned for display on the site.

Figure 2:
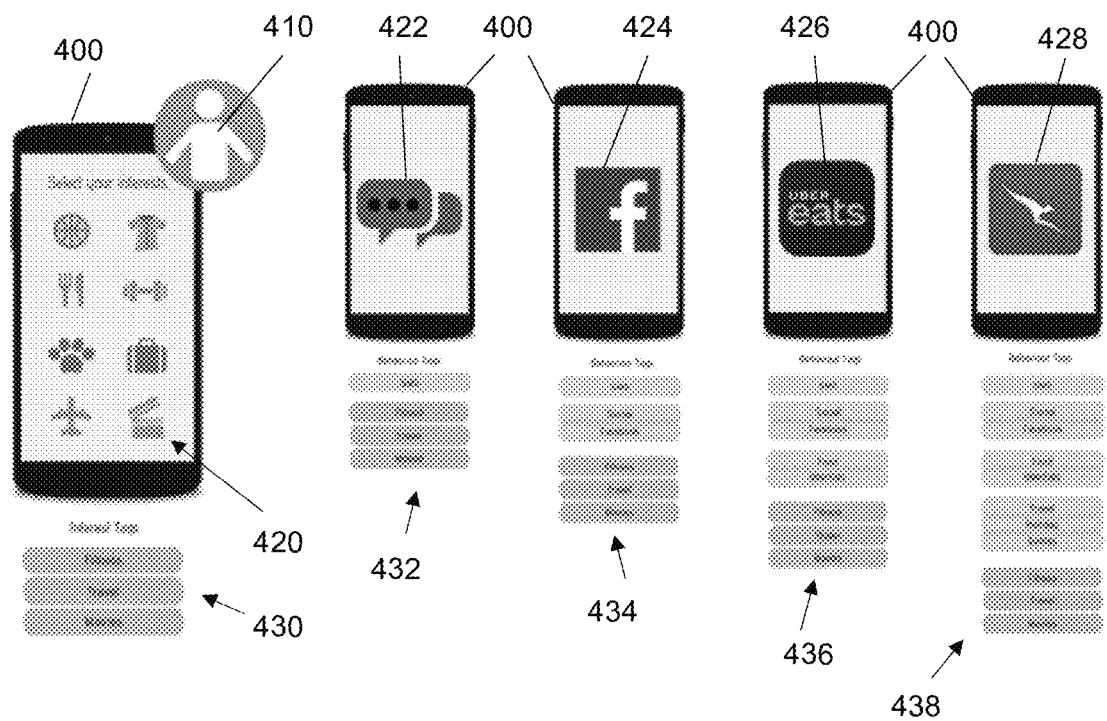
FIG. 2 shows a sequence of building a behaviour profile of application usage according to an aspect of an embodiment of the disclosed technology.

A user profile is stored on the device 14 in storage 22. The profile may include details such as but not limited to:
Age
Gender
Advertising ID
Location
Device
Carrier information Referring to FIG. 2, the user 410 of a device 400, which may be the device 14 or another device (such as a smart phone or tablet or similar), may be presented with 420 and asked to select categories of interests. The selections are recorded in the profile (as illustrated by tags 430). This profile data can then be integrated into advertising ecosystem 200 for appropriate advert targeting based on the user's details. Additionally, the behaviour of the user with respect to the apps they use and when they use them can also be used to select appropriately targeted advertising. For example, if we know when a user has used an Airline booking app and how long ago that app was used, this can be useful information to target appropriate travel oriented advertising.

Applications used are actively tagged with a defined tag set. For example, a food delivery app could be tagged with "Fast Food, Food Delivery", a betting app could be defined as "Sports, Sports Betting, Football" or any other set of 1 or more tags. Additionally, time bands can be attached to this tagging. For example, a tag will be valid if the app has been used in a certain time period (e.g. last hour, 7 days, 30 days etc).

Referring back to FIG. 2, when each of the Apps 422, 424, 426 and 428 are used the respective tags 432, 434, 436 and 438 are added to in the profile. Preferably the tags used are the IAB categories (or similar) with the same time banding concept. Thus, the profile builds up a current active tag profile of the user. This active tag set is essentially a current picture of user likes and behaviour with respect to the applications they use.

The Active Tag represents an organic view of the user that corresponds to the apps they use and when they use them.

A benefit of tagging in this way is that it uses the language of the advertising ecosystems—publishing tags—and it uses them in a way to represent user app behaviour. This in turn makes selection of targeted advertising easier and more likely to be of interest to the user. Tags can also represent a time component, with different tags representing activities in a configurable time based manner, e.g. user has used a ride sharing app within the last hour.

Figure 3:
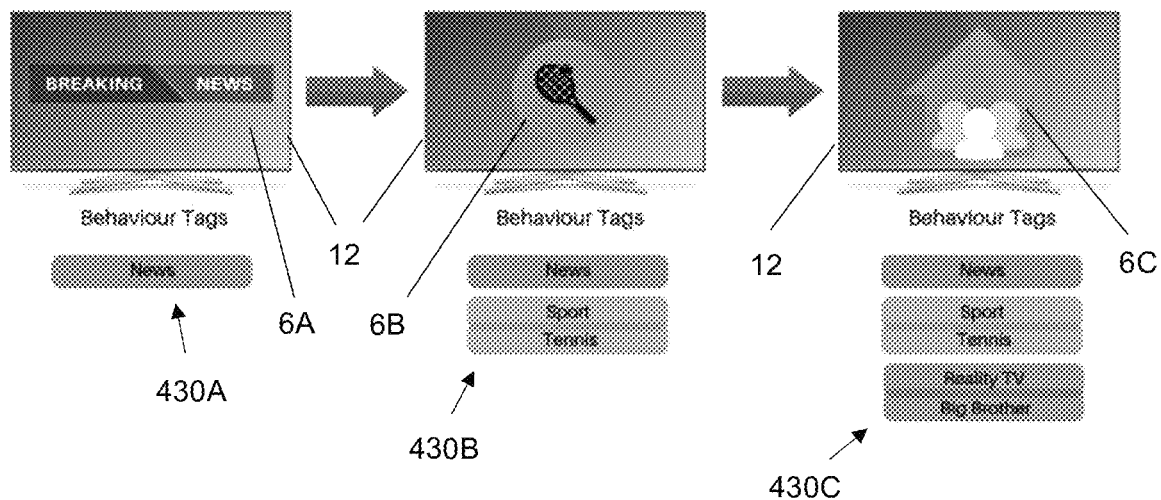
FIG. 3 shows another sequence of building a behaviour profile of media content/category/rating viewing according to another aspect of an embodiment of the disclosed technology.

Referring to FIG. 3, in a STB environment, any other apps that the user engages with are still tracked, but also active tags 430A, 430B and 430C are built up for content 6A, 6B and 6C that the user watches.

So, a comprehensive list of user content/genre/rating and viewing behaviour is built to in the user's profile by the behaviour module to be passed into Advertising interactions so better targeted advertising can be served.

Application Engagement Detour

In an embodiment, the service 30 has the capability to engage with the underlaying application to maximise the engagement opportunity by allowing targeted programmatic advertising, including targeted video advertising, to users in a streaming content environment whilst restricting any conflicts with streaming content.

Key Stroke Insertion

In an embodiment, the service 30 is configured to absorb all or some actions issued by a remote controller 15 and in turn issue its own commands.

Figure 4:
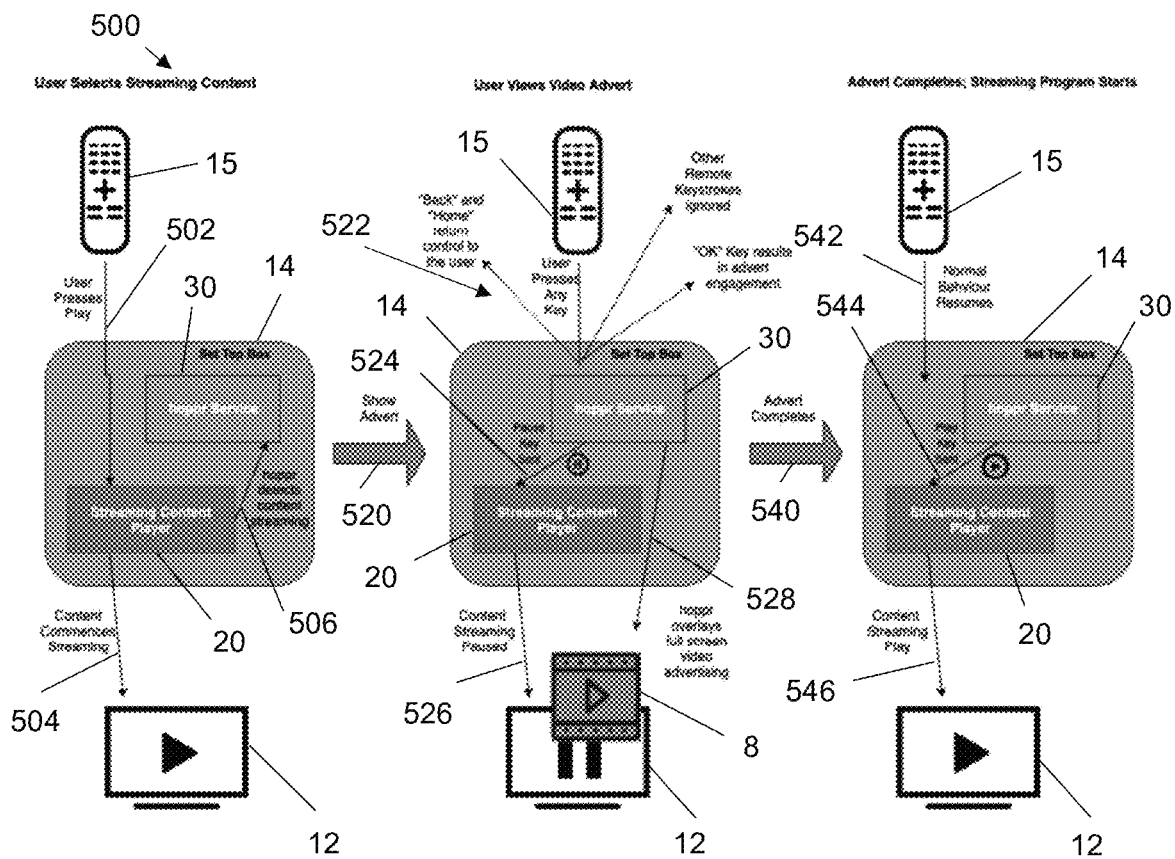
FIG. 4 shows a sequence of steps of controlling a digital device according to an aspect of an embodiment of the disclosed technology.

One use case of this capability is illustrated in FIG. 4. When the service 30 detects 506 that a user has started to play video content by pressing play 502, and when the service 30 is configured to show a full screen video advert in that instance 520, the streaming content player 20 would commence streaming the content 504 to the display/TV 12. However, the service 30 can then pause the currently playing show by itself issuing 524 a pause keystroke to the player, then ensure all keypresses from the remote (except, say, "back") are ignored 522, then, using overlay 8, show a full screen programmatic video advert provided 528 from the service 30 via a third party advertising ecosystem 200. When the advert is completed 540, the service 30 will then close the video ad overlay 8 and then send 544 a play keystroke to the media player 20. Normal functionality is resumed on received remote control button presses 542. Thus the overlaid content insertion can appear seamless, and as if part of the streamed content 504.

Interactive Button Press

In an embodiment, the service 30 is configured to parse the controls on streaming content player applications received from a remote controller 15. That is, it can see and engage with buttons on a content display page, such as "Play" or "Resume Watching".

Figure 5:
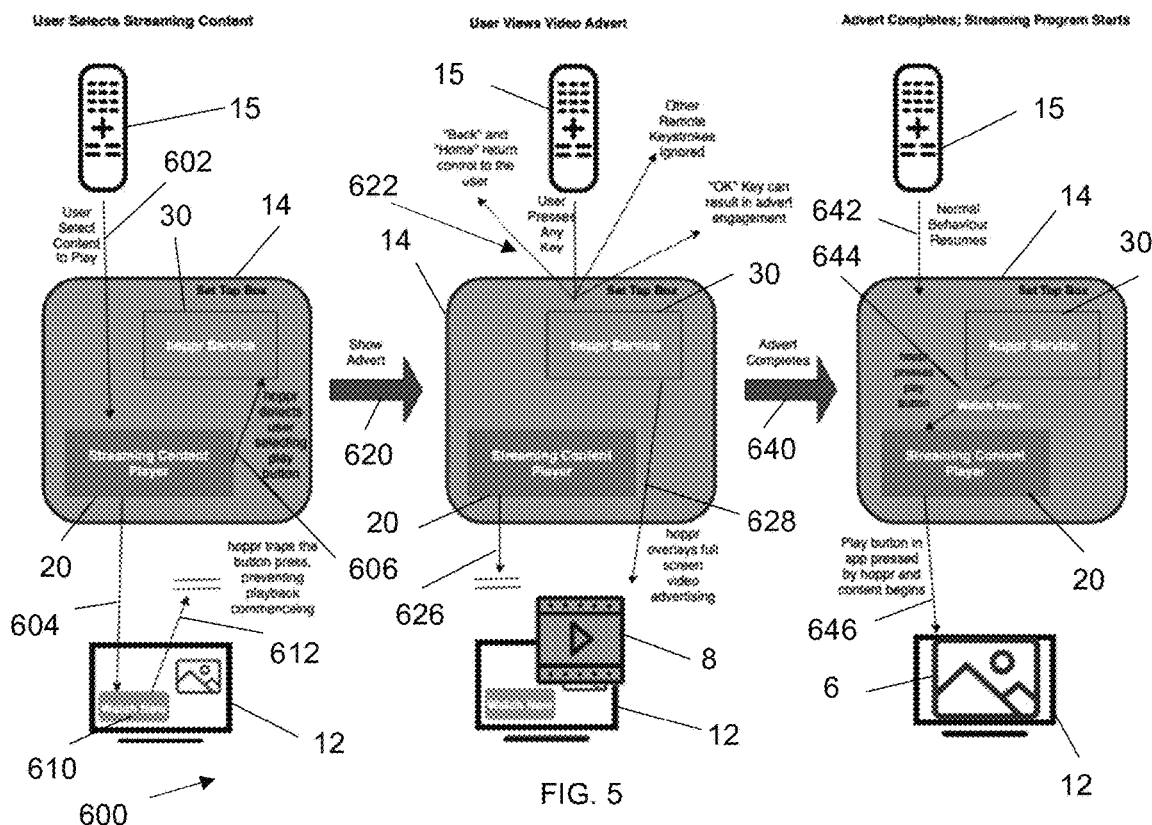
FIG. 5 shows another sequence of steps of controlling a digital device according to another aspect of an embodiment of the disclosed technology.

An example is described in relation to FIG. 5. The service 30 can detect 606 the user press of an in-app 12 button 610 via input 602 from the remote controller 15. The service can then trap 612 the button press, after the user has selected it but before the app is notified that the button 610 has been pressed. The service 30 can then show an advert 620 by using an overlay window 8 to, say, launch 628 a full screen overlay over the app 12. An example of this would be a full screen video advertisement. Button presses on the remote controller 15 are ignored during this time and the player 20 is waiting 626 for the user interaction. Once the advertisement is completed 640, the service 30 closes the overlay and then initiates the button press 644 that was previously selected by the user and normal behaviour resumes, ie., the content stream begins playing 646. Normal behavior also resumes 642 for the remote controller 15.

The advantage of this approach is that the video advert is not actually shown over the streaming content, but is shown over the content selection page, before the content has actually started, but this is seamless to the user as it appears like a standard pre-roll advertisement.

Programme Analysis

The service 30 is able to look at the underlying screen details of any application. The service 30 will do this for preconfigured applications that show information that can be harvested for enhanced advertising targeting. For example, the service 30 will analyse the details of a programme synopsis screen to derive information about the program about to stream. This allows targeted advertising including advertising that is age appropriate.

The service 30 can examine the layout profile and underlying structure of the running foreground application by continually viewing the application's Android view hierarchy by way of Android Accessibility Services. The service 30 can then discover internal identifiers of the foreground application that can include labels, buttons, window positions, references to images or URLs and whether a button is in focus. It can also examine the logging output of the running foreground application. The service 30 can then trigger activity such as showing an advertising overlay based on the presence, absence or use of the specified identifier. For example, the service 30 can detect that a live TV guide is currently showing over a live TV stream by seeing various internal system identifiers that make up the guide, such as a channel indicator, and so an advert can be shown at that time. Similarly, it can detect that the guide has disappeared and remove an advert, or show another different type of advertisement upon the disappearance of the guide.

Mobile Device Connectivity

Figure 6:
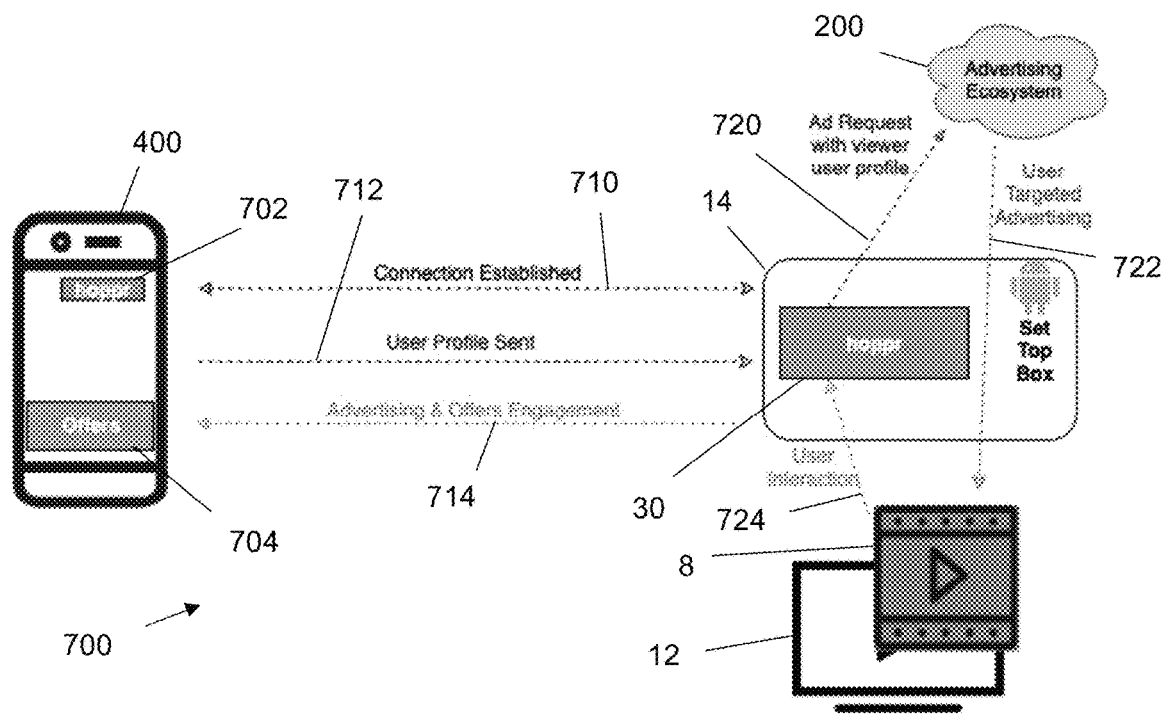
FIG. 6 shows interactions between parts of a content overlay system according to an embodiment of the disclosed technology.

Referring to FIG. 6, an App 702 can be installed on the user's mobile device 400, such as smart phone or tablet. The service 30 can communicate with a mobile device 400 on the same network. To initially ensure install of a mobile App 702, the overlay 8 can show a QR code for the device to read and drive install of the App 702 and to establish an authorised connection 710 to the service 30. Once connectivity is established between the mobile device 400 and the service 30, the service 30 can obtain 712 the user profile (e.g. Android Advertising identifier) as well as other profile information. When ad advertising call is made 720 by the service 30 to an advertising provider, this profile is passed through to the ecosystem 200. This means that the advert shown 722 is highly targeted to that user's profile. This connection also allows user engagement 724 in the advertisement, ie, selecting to get more information about an offer sent 714 to the mobile device.

The App can also provide Android TV application leanback capabilities ideal for use with a remote control.

Monitoring

There may also be provided a monitoring module for monitoring the performance and behaviour of the service 30 or its sub-modules. The overlay module 8, or another similar overlay module, is used to overlay a monitoring window whilst the standard service 30 is running over a user interface (UI). As the user moves around the UI and the service 30 performs actions like showing an advert, the monitoring module shows another overlay which indicates what the service is seeing and reacting to.

The disclosed technology provides an advantage in that it does not require any change to the content of the streaming applications.

Modifications may be made to the disclosed technology within the context of that described and shown in the drawings. Such modifications are intended to form part of the present disclosure.

What is claimed is:

1. A content overlay system for a digital device that displays streamed content in an active streaming window, the content overlay system comprising:
    a processor configured to monitor events of the digital device to generate data indicative of one or both of: activation of one or more applications of the digital device, and use of the one or more applications, wherein the processor is configured to process the generated data to determine one or both of: timing data indicative of when to overlay content on the active streaming window, and what content to overlay;
    an overlay generation module implemented by the processor for placing an overlaid window in front of the active streaming window and for displaying content in the overlaid window; the overlay generation module being configured to generate the overlaid window and display overlaid content in the overlaid window from an overlaid content server according to one or both of: the determined timing data, and the determined content; and
    a behavior monitor module implemented by the processor for monitoring applications used on the digital device and using the monitoring of applications to generate the generated data that is processed to determine one or both of: the timing data and what content to overlay, wherein the behavior monitor module allocates at least one tag to each use of each application used, wherein the behavior monitor module is configured so that tags are ranked according to a time when the application that caused the tag to be allocated was last used.

2. The system according to claim 1, wherein the one or more applications comprise a streaming content player.

3. The system according to claim 2, wherein the system further comprises a controller configured to provide control signals to the streaming content player for control of the display of the streamed content.

4. The system according to claim 3, wherein the control signals are in the form of an injected key stroke or button press/tap.

5. The system according to claim 3, wherein the controller intercepts key strokes or button presses/taps received from a user.

6. The system according to claim 5, wherein the intercepted keystrokes are stored for later injection into an input of the streaming content player.

7. The system according to claim 3, wherein the controller is configured to parse in-application inputs of the streaming content player and initiates overlaid content, where upon completion of the overlaid content the controller provides the input to the streaming content player.

8. The system according to claim 1, wherein monitoring events comprises monitoring streaming content players of the digital device.

9. The system according to claim 1, wherein the applications comprises an application for activation of and/or use of streaming content players of the digital device.

10. The system according to claim 1, wherein the monitoring comprises determining which applications are used and when they are used by a user to create an application use profile of the user.

11. The system according to claim 10, wherein the user profile is sent to the behavior monitor module for inclusion in the indication of user behavior.

12. The system according to claim 11, wherein the monitoring comprises determining which applications are used and when they are used, and wherein the mobile device allocates at least one tag to each use of each application used.

13. The system according to claim 1, wherein the tags are an indication of user behavior.

14. The system according to claim 1, wherein a tag may be allocated for a time period.

15. The system according to claim 14, wherein the behavior monitor module is configured so that at the end of the time period the tag is removed.

16. The system according to claim 1, wherein the behavior monitor module is configured so that the tags are accumulated according to the applications used until they each are removed due to age.

17. The system according to claim 1, wherein the processor sends the generated data to the overlaid content server and the overlaid content server provides content to be displayed to the overlay generation module.

18. The system according to claim 17, wherein the processor requests the overlaid content server provide content to be displayed according to the generated data.

19. The system according to claim 17, wherein the overlaid content server provides overlaid content according to a content type.

20. The system according to claim 1, wherein each application provides the activity it is performing to the processor and wherein the processor uses the activity each application is performing to determine the timing data and/or to determine the content.

21. The system according to claim 1, wherein the overlay generation module is configured to generate the overlay window as an alert window using an operating system or a software component bundled with an operating system.

22. The system according to claim 21, wherein the overlaid window is configured as a web container.

23. The system according to claim 21, wherein the overlaid window is configured according to the generated data.

24. The system according to claim 21, wherein the configuration of the overlaid window is made according to the generated data and/or a content type.

25. The system according to claim 1, wherein the processor is further configured to create an account stored by the overlaid content server, and store an identification to a user allocated by the overlaid content server.

26. The system according to claim 1, wherein the location of the digital device is determined and the location is used to determine the overlaid content.

27. The system according to claim 1, wherein the processor is configured such that key strokes or button presses/taps received by the media player device are intercepted and later injected as input to the streaming content player to facilitate presentation of the overlaid content.

28. The system according to claim 1, wherein the processor is also configured to generate data based on the content to be or being streamed, wherein the data is used to select the overlaid content.

29. The system according to claim 1, wherein the system comprises a connection to a mobile device.

30. The system according to claim 29, wherein the overlaid content, or related content, is transmitted to the mobile device via the connection.

31. The system according to claim 29, wherein the mobile device is configured to generate a user profile by monitoring applications used on the mobile device.

32. The system according to claim 1, wherein the one or more applications of the digital device comprise an application other than for streaming and an application other than for displaying content in the overlaid window.

33. An overlaid content server for serving overlaid content to a digital device, said server comprising:
  a receiver of data from one or more digital devices, the data indicative of behavior of a respective user of the corresponding digital device and one or both of: activation of one or more applications, and use of one or more of the applications;
  a processor for determining overlaid content to be transmitted to the respective digital device, wherein the determination comprises selecting and/or configuring overlaid content according to one or more of:
  I) behavior of the respective user of the corresponding digital device, and
  II) one or both of:
    a. the activation of one or more of the applications of the corresponding digital device, and
    b. use of one or more of the applications of the corresponding digital device;
  a transmitter of the respective overlaid content to the corresponding digital device;
  a behavior monitor module implemented by the processor for monitoring applications used on the digital device and using the monitoring of applications to generate the generated data that is processed to determine one or both of: the timing data and what content to overlay, wherein the behavior monitor module allocates at least one tag to each use of each application used, wherein the behavior monitor module is configured so that tags are ranked according to a time when the application that caused the tag to be allocated was last used.

34. A method of providing overlaid content on a digital device, comprising:
  monitoring one or more applications used on the digital device to generate data indicative of one or both of: activation of one or more of the applications, and use of one or more of the applications;

allocating at least one tag to each use of each application used;

ranking the tags according to a time when the application that caused the tag to be allocated was last used;

determining, based on the generated data and the ranked tags, one or both of: timing of when to overlay content on an active window of an active one of the applications, and what content to overlay; and placing an overlaid window in front of the active streaming window;

receiving overlaid content from an overlaid content server according to one or both of the determined timing and the determined content; and displaying the overlaid content in the overlaid window.

35. A content overlay system for a digital device comprising:

a processor configured to monitor events of the digital device to generate data indicative of one or both of activation of the digital device and use of one or more applications of the digital device;

the processor being configured to process the generated data to determine timing data indicative of when to overlay content on an active window; a behavior monitor module implemented by the processor for monitoring applications used on the digital device and using the monitoring of applications to generate the generated data that is processed to determine one or both of: the timing data and what content to overlay, wherein the behavior monitor module allocates at least one tag to each use of each application used, wherein the behavior monitor module is configured so that tags are ranked according to a time when the application that caused the tag to be allocated was last used; and an overlay generation module implemented by the processor for placing an overlaid window in front of the active streaming window or application and for displaying content in the overlaid window; the overlay generation module being configured to generate the overlaid window and display content from an overlaid content server according to the determined timing data and the ranked tags.

36. A content overlay system for a digital device comprising: a processor configured to monitor events of the digital device to generate data indicative of activation of and/or use of one or more applications of the digital device, the processor being configured to process the generated data to determine what content to overlay;

a behavior monitor module implemented by the processor for monitoring applications used on the digital device and using the monitoring of applications to generate the generated data that is processed to determine one or both of: the timing data and what content to overlay, wherein the behavior monitor module allocates at least one tag to each use of each application used, wherein the behavior monitor module is configured so that tags are ranked according to a time when the application that caused the tag to be allocated was last used; and an overlay generation module implemented by the processor for placing an overlaid window in front of the active streaming window or application and for displaying content in the overlaid window; the overlay generation module being configured to generate the overlaid window and display content from an overlaid content server according to the determined content and the ranked tags.

37. A content overlay system for a digital device comprising: a processor configured to monitor events of the digital device to generate data indicative of activation of and/or use of one or more applications of the digital device, the processor being configured to process the generated data to determine timing data indicative of when to overlay content on an active window and to determine what content to overlay;

a behavior monitor module implemented by the processor for monitoring applications used on the digital device and using the monitoring of applications to generate the generated data that is processed to determine one or both of: the timing data and what content to overlay, wherein the behavior monitor module allocates at least one tag to each use of each application used, wherein the behavior monitor module is configured so that tags are ranked according to a time when the application that caused the tag to be allocated was last used; and an overlay generation module for placing an overlaid window in front of the active streaming window or application and for displaying content in the overlaid window; the overlay generation module being configured to generate the overlaid window and display content from an overlaid content server according to the determined timing data and determined content and the ranked tags.

* * * * *